US008979179B2

(12) United States Patent
Mildner et al.

(10) Patent No.: US 8,979,179 B2
(45) Date of Patent: Mar. 17, 2015

(54) FLOOR STRUCTURE OF A MOTOR VEHICLE BODY

(71) Applicant: GM Global Technology Operations LLC, Detroit, MI (US)

(72) Inventors: Udo Mildner, Limburg (DE); Karsten Bohle, Bad Schwalbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/804,497

(22) Filed: Mar. 14, 2013

(65) Prior Publication Data
US 2013/0257105 A1 Oct. 3, 2013

(30) Foreign Application Priority Data

Mar. 29, 2012 (DE) .......................... 10 2012 006 527

(51) Int. Cl.
B62D 25/20 (2006.01)
(52) U.S. Cl.
CPC ............ B62D 25/20 (2013.01); B62D 25/2018 (2013.01)
USPC ...................................... 296/193.07; 296/204
(58) Field of Classification Search
USPC ................. 296/187.08, 193.07, 204, 29, 209, 296/203.03
See application file for complete search history.

(56) References Cited

U.S. PATENT DOCUMENTS

| 3,481,643 | A |  | 12/1969 | Campbell | |
|---|---|---|---|---|---|
| 4,976,490 | A |  | 12/1990 | Gentle | |
| 5,476,303 | A | * | 12/1995 | Sakamoto et al. | 296/204 |
| 5,704,644 | A | * | 1/1998 | Jaggi | 280/796 |
| 5,992,926 | A | * | 11/1999 | Christofaro et al. | 296/204 |
| 6,039,386 | A | * | 3/2000 | Hasshi et al. | 296/203.01 |
| 6,504,286 | B1 |  | 1/2003 | Porat et al. | |
| 6,666,501 | B1 | * | 12/2003 | Logan et al. | 296/193.07 |
| 7,270,369 | B2 | * | 9/2007 | Okana et al. | 296/204 |
| 8,376,454 | B2 | * | 2/2013 | Mildner | 296/193.08 |
| 8,398,158 | B2 | * | 3/2013 | Mildner et al. | 296/193.07 |
| 8,657,369 | B2 | * | 2/2014 | Mildner et al. | 296/204 |
| 8,668,248 | B2 | * | 3/2014 | Ishizono et al. | 296/187.08 |
| 2008/0007089 | A1 | * | 1/2008 | Bachmann | 296/187.08 |

(Continued)

FOREIGN PATENT DOCUMENTS

DE 10260393 A1 1/2004
DE 102006001348 A1 7/2007

(Continued)

OTHER PUBLICATIONS

German Patent Office, German Patent Search Report for Application No. 102012006527.2, dated on Dec. 3, 2012.

(Continued)

*Primary Examiner* — Gregory Blankenship
(74) *Attorney, Agent, or Firm* — Ingrassia Fisher & Lorenz, P.C.

(57) ABSTRACT

A floor structure of a motor vehicle body having a floor panel is provided. The floor structure comprises a seat connection portion which with respect to a front foot well portion is formed in vehicle vertical direction and a support structure provided below the floor panel with two longitudinal structures running in vehicle longitudinal direction and spaced from one another in vehicle transverse direction. Below the seat connection portion a cross member structure formed in one piece and corresponding to the total area of the seat connection portion is connected to the longitudinal structures located opposite in vehicle transverse direction.

16 Claims, 6 Drawing Sheets

(56) References Cited

U.S. PATENT DOCUMENTS

| | | |
|---|---|---|
| 2008/0238152 A1 | 10/2008 | Konishi et al. |
| 2010/0320800 A1* | 12/2010 | Minami et al. .......... 296/187.08 |
| 2011/0266838 A1* | 11/2011 | Leopold .................. 296/193.07 |
| 2011/0298246 A1* | 12/2011 | Mildner ................... 296/193.07 |
| 2012/0080907 A1* | 4/2012 | Tamaki ................... 296/193.07 |
| 2012/0119545 A1* | 5/2012 | Mildner et al. .......... 296/193.07 |
| 2012/0212009 A1* | 8/2012 | Ishizono et al. ......... 296/193.07 |
| 2012/0248822 A1* | 10/2012 | Mildner et al. .......... 296/193.07 |
| 2012/0274100 A1* | 11/2012 | Mildner et al. .......... 296/193.07 |
| 2013/0181486 A1* | 7/2013 | Tabuteau et al. ............. 296/204 |
| 2013/0257105 A1* | 10/2013 | Mildner et al. ............... 296/204 |
| 2013/0328353 A1* | 12/2013 | Jojiki et al. ............. 296/193.07 |
| 2013/0341969 A1* | 12/2013 | Fujii et al. .............. 296/193.07 |

FOREIGN PATENT DOCUMENTS

| | | |
|---|---|---|
| DE | 102006052355 A1 | 5/2008 |
| DE | 102007002209 A1 | 7/2008 |
| DE | 102010018638 A1 | 11/2011 |
| EP | 0331945 A2 | 9/1989 |
| JP | 2010042726 A | 2/2010 |
| WO | 2012010769 A1 | 1/2012 |

OTHER PUBLICATIONS

German Patent Office, German Patent Search Report for Application No. 102012006528.0, dated on Dec. 3, 2012.

* cited by examiner

FLOOR STRUCTURE OF A MOTOR VEHICLE BODY

CROSS-REFERENCE TO RELATED APPLICATION

This application claims priority to German Patent Application No. 10 2012 006 527.2, filed Mar. 29, 2012, which is incorporated herein by reference in its entirety.

TECHNICAL FIELD

The present disclosure relates to the floor structure of a motor vehicle body with a floor panel and a support structure provided below the floor panel, which is formed in particular as seat support structure for fastening vehicle seats.

BACKGROUND

In the construction of motor vehicle bodies there exist various concepts for implementing a floor structure to be provided in particular in the region of a passenger cell of the motor vehicle. Known floor structures typically have a center tunnel extending almost over the entire length of the passenger cell and over the middle of the floor structure and seat cross members arranged on the top of a floor panel and provided separately for fastening vehicle seats. The actual floor panel in this case is mostly formed of multiple parts and typically adjoins the center tunnel approximately laterally with individual floor panel segments.

Thus, a floor structure of a vehicle is also known from DE 198 12 084 A1, which comprises left and right side sills and a substantially flat floor panel, which extends between the side sills. Furthermore, a transverse element for connecting the left and right side sills is provided which each extend inwards from the left and right side sills and are attached to an upper surface of the floor plate.

Centre tunnels structures penetrating the entire vehicle floor in vehicle longitudinal direction on the one hand limit the utilizable leg room for the rear passengers of a motor vehicle. Furthermore, a separate fastening of a center tunnel to the vehicle floor proves to be relatively involved in terms of production and assembly. Floor panels formed in multiple parts also have the disadvantage that for forming a closed floor structure, they have to be fastened to one another in an overlapping manner at least in regions. Doubling of material in the connecting region of individual floor panel portions to be provided for this purpose contribute to an increase of the vehicle weight.

In addition, other objects, desirable features and characteristics will become apparent from the subsequent summary and detailed description, and the appended claims, taken in conjunction with the accompanying drawings and this background.

SUMMARY

The present disclosure provides a floor structure of a motor vehicle body which is improved with respect to its bending and structural stiffness. This is to be accompanied by a weight and/or component reduction and furthermore make possible a simple and cost-effective production. Furthermore, the floor structure is to contribute to increasing possible vibration natural frequencies of the motor vehicle bodies and counteract resonance and vibration effects that occur during the operation of the vehicle in a damping manner. In addition, the floor structure is to make possible a simplified and universally adaptable seat connection.

The floor structure of a motor vehicle body provided accordingly comprises a floor panel and a support structure provided below the floor panel. The floor panel to this end comprises a seat connection portion which, compared with a front foot well portion in vehicle vertical direction (z) is formed elevated or arranged elevated. The support structure located below meanwhile has at least two longitudinal structures substantially running in vehicle longitudinal direction (x) and spaced from one another in vehicle transverse direction (y) typically in the form of side sills and/or side members.

Below the seat connection portion, a unitarily formed cross member structure corresponding to the overall area of the seat connection portion is connected to the longitudinal structures located opposite in vehicle transverse direction (y). The cross member structure provides a comparatively large-area transverse connection between the longitudinal structures. The area geometry or the area dimensions of the cross member structure extending between the longitudinal structures conforms or corresponds to the geometrical configuration, in particular the area size of the seat connection portion provided for the seat connection.

Here it is advantageously provided, in particular, if the cross member structure and the seat connection portion located above in vehicle vertical direction (z) with respect to a vehicle plane extending in vehicle longitudinal direction (x) and vehicle transverse direction (y) are substantially arranged in an overlapping or covering manner.

The seat connection portion, which is generally formed as an integral part of the floor panel, can be structurally reinforced through the cross member structure located directly below. Owing to the fact that the cross member structure directly interconnecting the longitudinal structures comprises at least one extension in vehicle longitudinal direction (x), which corresponds to the length of a seat connection, a particularly torsionally stiff and rigid transverse connection of the longitudinal structures can be provided. Here, the length (x) to width (y)—ratio of the cross member structure can amount to between about 1:10 and about 1:1.5, for example, between about 1:5 and about 1:2.

According to one exemplary embodiment, the cross member structure comprises a shell-like and predominantly closed areal structure. Furthermore, the cross member structure can be formed largely flat at least in regions. In particular, in connecting regions to adjoining components of a motor vehicle body and/or their floor structure, however, geometrical configuration and profile geometries adapted to the respective connection portions are an advantage. The entire cross member structure in this case can be formed as an individual part, which is cut out or punched out of a sheet metal cutting and for example brought into a predetermined geometrical form by means of a forming operation, for example by means of stamping.

In particular for space reasons or for reasons of weight saving, the areal structure forming the cross member structure can also comprise individual clearances or through-openings. These can be formed in particular for receiving further function components of a motor vehicle, such as for example accommodating a fuel tank, a vehicle battery, a fuel pump or other components generally to be provided in the exterior space of the motor vehicle.

According to one exemplary embodiment, the cross member structure is structurally connected to the longitudinal structures located opposite along its entire extension in vehicle longitudinal direction (x). Corresponding to the comparatively long extension in vehicle longitudinal direction of the cross member structure, a high torsionally stiff and rigid of the floor structure can be provided in the seat connection region through the connection to the longitudinal structures located opposite.

Here it is provided, in particular, that the cross member structure supports itself over its entire longitudinal extension at least once-off or multiple times on the longitudinal structure with at least one connection flange and along a support contour formed thereby is generally non-releasably connected to the respective longitudinal structure either intermittently or continuously, for example along a joining seam. A load-transmitting structural connection of the cross member structure to the longitudinal structures located opposite can be achieved here by means of welding, riveting and/or gluing but also by means of penetration joining.

The comparatively large-area connection of the cross member structure can furthermore contribute to improving the dimensional accuracy of the body structure. Through the comparatively long joining location between cross member structure and longitudinal structure corresponding to the longitudinal extension of the cross member structure, the natural vibration behavior of the floor structure, in particular its bending frequency, can be advantageously changed, in particular increased, so that the frequency range can be shifted from natural frequencies that are invariably created during the operation of the vehicle to advantageously higher frequency ranges that can be perceived by the vehicle occupants to a lesser degree.

In one exemplary embodiment, the longitudinal structures comprise an inner sill profile projecting in vehicle transverse direction (x) to the inside and a side member profile connected therewith. The side member profile in this case can have an in particular L-shaped form and, with a leg approximately projecting horizontally to the outside, adjoin the inner sill profile projecting to the inside from the inside and be structurally connected to the latter there. A further leg of the L-shaped side member profile in this case can project from an end of the horizontally oriented leg of the side member profile located opposite upwards in vehicle vertical direction (z).

It is advantageous, if the cross member structure comprises a lateral connecting slope substantially closing off the side member profile, with which the cross member structure bears on the side member profile. To this extent, a connecting slope of the cross member structure projecting in vehicle transverse direction to the outside and obliquely downwards can act as closing plate for the L-shaped side member profile that is formed open towards the top.

According to another exemplary embodiment, the connecting slope of the cross member structure furthermore adjoins a profile portion of the sill profile projecting from the bottom to the inside and/or is supported on the latter.

To that extent it can be provided to structurally connect the cross member structure, in particular its connecting slope to the side member profile and/or to the inner sill profile. By means of the connecting slope projecting to the outside, in vehicle transverse direction (y), and downwards it is achieved, furthermore, that the region of the cross member structure located approximately in the middle between the longitudinal structures located opposite is located with respect to the vehicle vertical direction (z), above the longitudinal structures.

Here it is conceivable, furthermore, that the cross member structure with its connecting slope projecting obliquely to the outside and downwards, is supported on the profile portion of the inner sill profile projecting to the inside independently of the configuration of the side member profile, wherein the connecting slope will then not necessarily have to fulfill a closing function for a possible side member profile.

According to one exemplary embodiment, the seat connection portion provided above the cross member structure adjoins a profile portion of the inner sill profile projecting to the inside from the top with a lateral cheek located in vehicle transverse direction (y). Advantageously it is provided here in particular that the lateral cheeks of the seat connection portion and the connecting slope of the cross member structure spaced there from in vehicle vertical direction (z) enclose or encase at least in regions the sill profile projecting to the inside.

If the lateral cheek and/or the connecting slope is/are structurally connected to the inner sill profile in the region of the support on the inner sill profile, a further structural reinforcement and an improved mechanical stability of the floor structure can be achieved, which can prove to be advantageous for the lateral impact behavior of the floor structure, respectively of the body and of the vehicle correspondingly equipped with this.

Through the height-offset arrangement of the seat connection portion on the one hand and the cross member structure on the other hand on the inner sill profile, the torsional stiffness of the interconnected floor structure components can also be improved in a plane defined by vehicle transverse direction (y) and vehicle vertical direction (z) compared with a single, for example intermittent connection.

According to one exemplary embodiment, the seat connection portion and the transverse structure located below comprise transverse profile portions corresponding to one another and forming at least one closed hollow profile portion on at least one end alongside the vehicle or end portion. By means of such transverse profile portions corresponding to one another, which generally extend over the entire width of the transverse structure, at least one front and/or one rear end portion of the seat connection portion can be structurally reinforced.

This proves to be advantageous in particular with configurations such as those in which the floor panel has a height offset in vehicle longitudinal direction adjoining the seat connection portion. By means of the transverse profile portions, the regions of the seat connection portion adjoining the height offset can namely be structurally reinforced in a suitable manner. Furthermore, the largely closed front and rear hollow profiles formed by the transverse profile portions corresponding with one another can act as a type of cross member between the longitudinal structures of the support structure.

According to one exemplary embodiment, at least one reinforcement rail for a seat connection is arranged on the bottom side of the seat connection portion. The reinforcement rail in this case generally extends in vehicle longitudinal direction (x). The reinforcement rail can in particular act as material doubling for a seat connection and can advantageously extend over the entire length of the seat connection portion of the floor panel. Any concentrated loads that occur in the seat connection region can be introduced into the reinforcement rail at selected fastening points and, via the latter, be largely evenly discharged into the seat connection portion of the floor panel.

According to one exemplary embodiment, it is provided, in particular, that the seat connection portion of the floor panel comprises at least one elongated hole extending in vehicle transverse direction (y) for the variable positioning of the at least one reinforcement rail in vehicle transverse direction (y). In this way, individual reinforcement rails provided for the seat connection can be positioned at different distances from one another in vehicle transverse direction (y) and fastened to the seat connection portion of the floor panel.

Through the formation of the at least one elongated hole, the seat connection portion can be universally adapted to different seat tracks or seat widths and thus to different interior dimensions of the motor vehicle. In addition, any component or assembly tolerances can be largely offset and compensated through the elongated hole-type fastening of the reinforcement rails to the seat connection portion.

Advantageously it is provided here, furthermore, if according to one exemplary embodiment the reinforcement rail comprises at least one fastening element for the seat connection. Thus, the reinforcement rail can comprise for example a fastening element, such as a weld nut for the seat fastening preassembled thereon. It is advantageous, furthermore, if the reinforcement rail is displaceably held on the seat connection portion of the floor panel in a preassembly configuration in the direction of the at least one elongated hole, and if in this case the fastening element is accessible from the top through the elongated hole formed in the seat connection portion.

According to one exemplary embodiment, the cross member structure provided between the longitudinal structures comprises at least one corner support projecting in vehicle vertical direction (z) for the seat connection portion on front and/or rear end portions located outside in vehicle transverse direction (y). The corner support can have a trapezium or ramp-like geometry and can serve for reinforcing and stiffening the outer corners of the seat connection portion located above.

Independently of this, the seat connection portion and the cross member structure located below can each have a shell-like structure, which in the joined state forms a double floor.

According to one exemplary embodiment, the seat connection portion provided adjoining the foot well portion of the floor panel is formed free of a center tunnel. The center tunnel-free configuration in this case can be achieved in particular through the height offset between seat connection portion and foot well portion of the floor panel. Foot well portion and seat connection portion in this case can also be configured unitarily as a continuous floor panel, but alternatively also in multiple parts, as an assembled floor panel.

Through the configuration of the seat connection portion that is offset or elevated in vehicle vertical direction with respect to the foot well portion, additional installation space can be provided below the seat connection portion, which is suitable in particular for stowing additional vehicle components such as for example a fuel tank or one or a plurality of vehicle batteries or accumulators. The floor panel that is formed elevated in the region of the seat connection is suitable in this case in one example, for so-called multipurpose vehicles (MPV) or for sport utility vehicles (SUV), which due to their design have a relatively large distance between a floor structure and the floor line or the tire contact plane anyway.

According to one exemplary embodiment, the front foot well portion comprises at least one reinforcement profile extending from a center tunnel portion to the front, in travelling direction, and obliquely to the outside, in vehicle transverse direction, which is generally formed as a substantially top-hat profile designed open towards the bottom and which through placement and fastening to the front foot well portion of the floor panel located below is largely closed off. The reinforcement profile in this case can extend as far as to the foot well portion of the floor panel adjoining the front foot well portion.

Finally, a motor vehicle body is provided according to various aspects, which comprises a floor structure described before.

Independently of this, a motor vehicle having a corresponding body or a floor structure described before is provided in various aspects.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
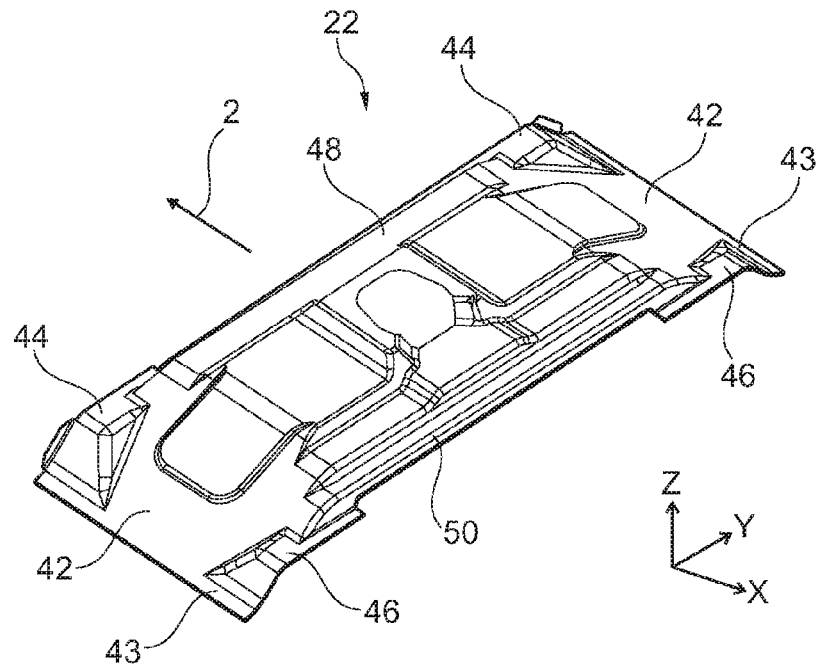
FIG. 1 is a perspective representation of the cross member structure viewed from obliquely above.
Figure 2:
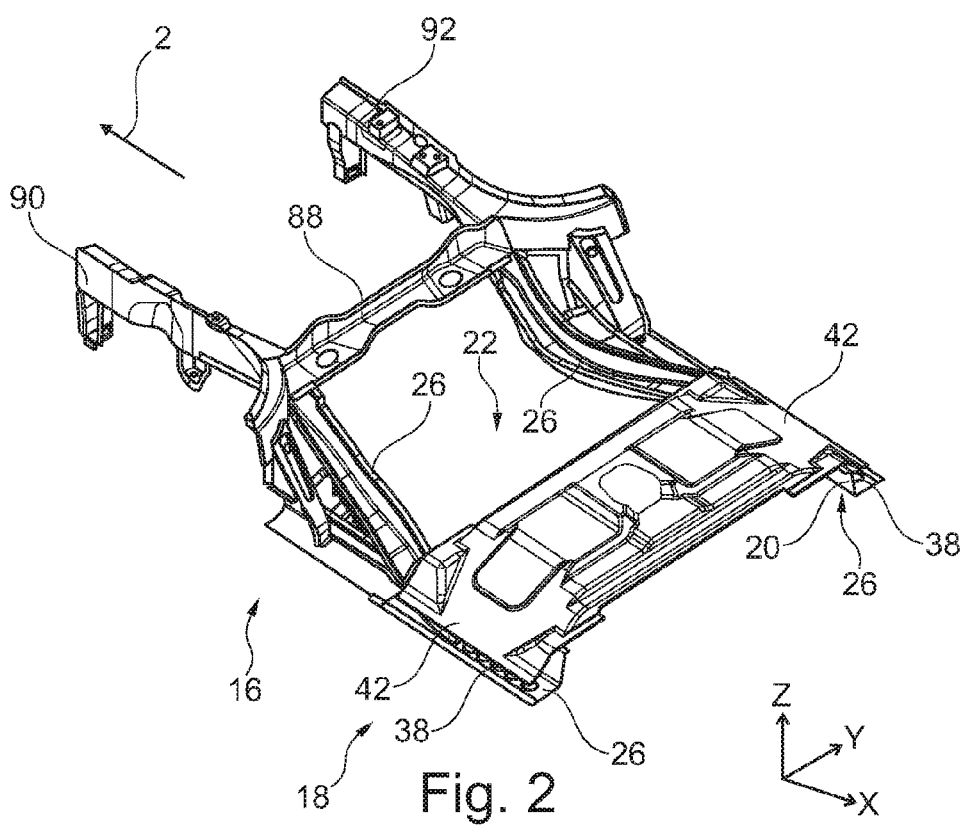
FIG. 2 is the support structure provided below the floor panel.
Figure 3:
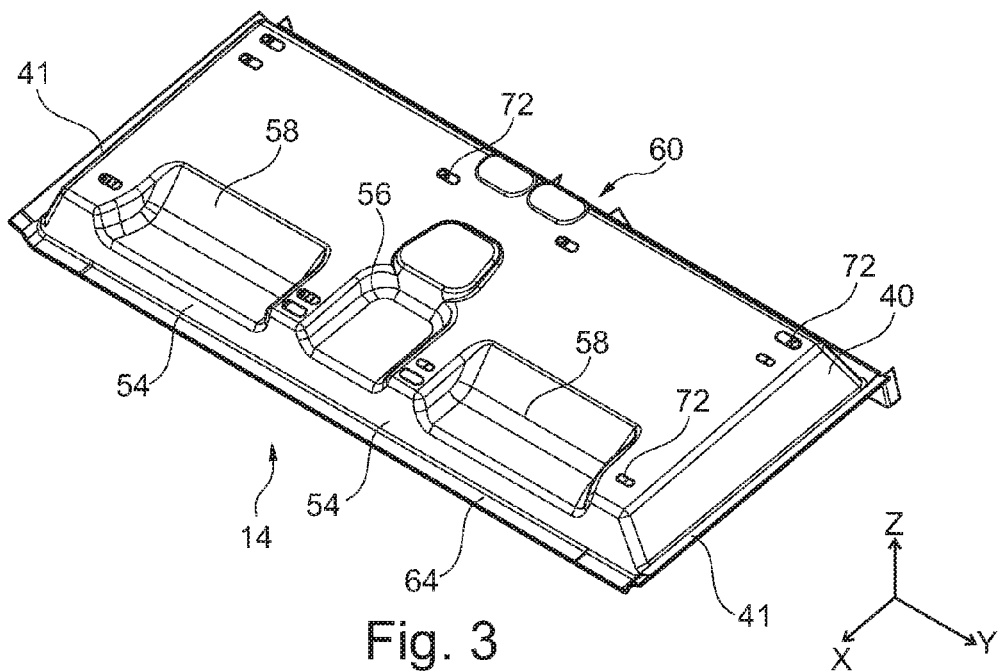
FIG. 3 is a perspective representation of the seat connection portion viewed from obliquely above.

FIG. 1 shows in isolated representation a cross member structure 22 formed as areal structure, which in the manner shown in FIG. 2 can be arranged between two longitudinal structures 18, 20 substantially extending in vehicle longitudinal direction (x). The support structure 16 additionally shown in FIG. 2 comprises two front side members 90, 92, which later on, located in front of the passenger cell later on of a motor vehicle not explicitly shown here, are structurally interconnected via a front wall member 88 in vehicle transverse direction (y).

Starting out from the front wall cross member 88, two lateral side member profiles 26 extend to the back, opposite to the travelling direction 2 to the motor vehicle. The cross member structure 22 has a shell-like and wide-surface configuration and comes to lie above the side member profile 26 with approximately L-shaped configuration.

The cross member structure 22 which is constructed comparatively wide in vehicle longitudinal direction forms a ladder or lattice-like support structure 16 with the front wall cross member 88 and the lateral side member profiles 26, which in particular, because of the dimensioning and the geometrical configuration of the cross member structure 22, provides for a high torsional stiffness.

Figure 7:
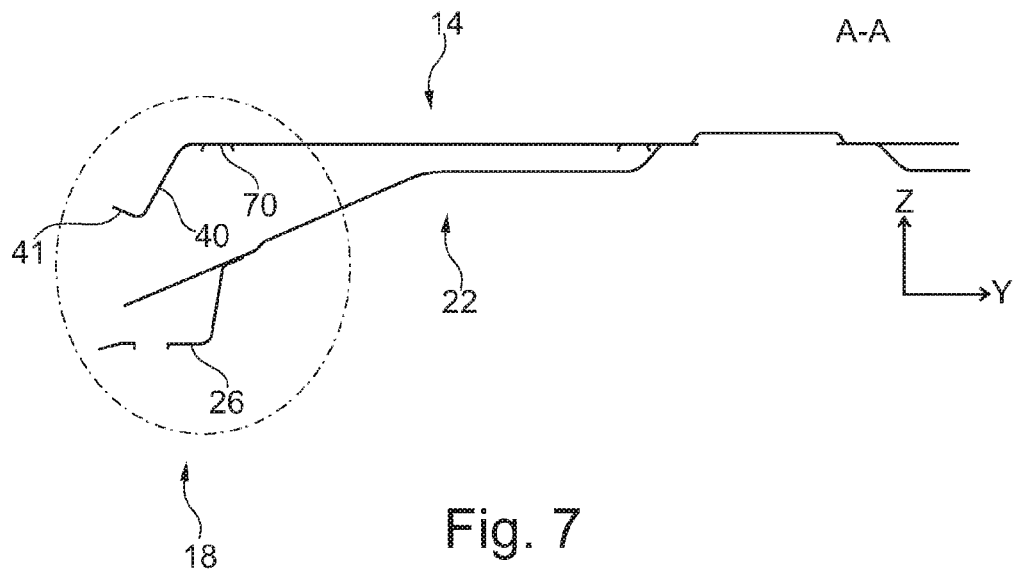
FIG. 7 is a cross section along A-A according to FIG. 6.
Figure 8:
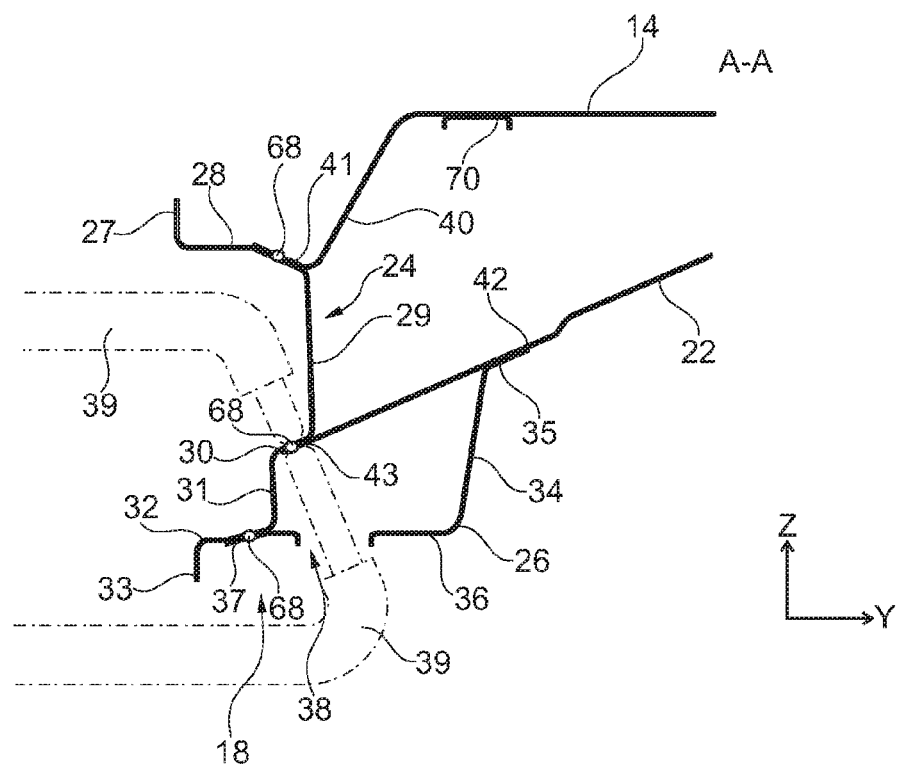
FIG. 8 is an enlarged representation of the cross section according to FIG. 7 in the lateral connection region of cross member structure and floor panel to the lateral longitudinal structure.

As is shown in cross section according to FIGS. 7 and 8, the cross member structure 22 formed as sheet metal shell comprises a connecting slope 42 each projecting to the outside, in vehicle transverse direction (y), which in a final assembly configuration, as shown in FIG. 8, acts as a type of closing plate for the side member profile 26 that is approximately L-shaped in cross section. Furthermore, the cross member structure 22 has a flange 43 at its lateral edges located in vehicle transverse direction (y), by means of which the connecting slope 42 can be fastened to a profile portion 29 of an inner sill profile 24 of the longitudinal structure 18, 20 over its entire extension in vehicle longitudinal direction (x).

Advantageously, the flange 43 in this case adjoins a lower leg 30 of the inner sill profile 24 where it is structurally connected to the inner sill profile 24. For establishing a connection, for example a spot weld, a plurality of through-openings 38 spaced from one another in vehicle longitudinal direction (x) is provided for this purpose in a lower leg 36 of the side member profile 26, through which a welding tool 39 can be passed for forming a spot weld 68.

The its lower leg 36 and a flange 37 provided thereon and projecting to the outside, the side member profile 26 adjoins a leg 32 of the inner sill profile 24 projecting to the inside where it is generally structurally connected to the latter, in particular welded. Here, merely the inner sill profile 24 is shown in FIG. 8, which can be connected by means of an upper flange 27 and lower flange 33 to a corresponding outer sill profile which is not shown here for forming a side sill.

Starting out from the lower leg 32 projecting to the inside, the side member profile 26 extends to the inside, wherein a leg 34 of the side member profile 26 projecting upwards in vehicle vertical direction (z) comprises a flange 35 adapted to the profile of the connecting slope 42 on its upper end portion. The cross member structure 22 with its connecting slope 42 supports itself against this flange 35.

Apart from the through-openings 38 for the welding tool 39, the side member profile 26 together with the connecting slope 42 and with a leg 30 of the inner sill profile 24 adjoining thereon and a further profile portion 31 adjoining thereon, forms a substantially closed hollow profile extending in vehicle longitudinal direction (x).

The shell-like cross member structure 22 shown in FIGS. 1 and 2 serves for an elevated seat connection and shifts the floor panel 10 of the floor structure relative to a front foot well portion 12 outwards at least in regions. Furthermore, the cross member structure 22 makes available a torsionally stiff and rigid connection of the lateral longitudinal structures 18, 20, so that in particular the lateral side member profiles 26 together with the front wall cross member 88 and with the cross member structure 22, make available a ladder or lattice-type support structure 16.

In particular through the comparatively long configuration of the cross member structure 22 in vehicle transverse direction (x) extending over an entire seat connection portion 14, a particularly stable and dimensionally accurate connection of the longitudinal structures 18, 20 located opposite in vehicle transverse direction (y) can be provided.

Figure 5:
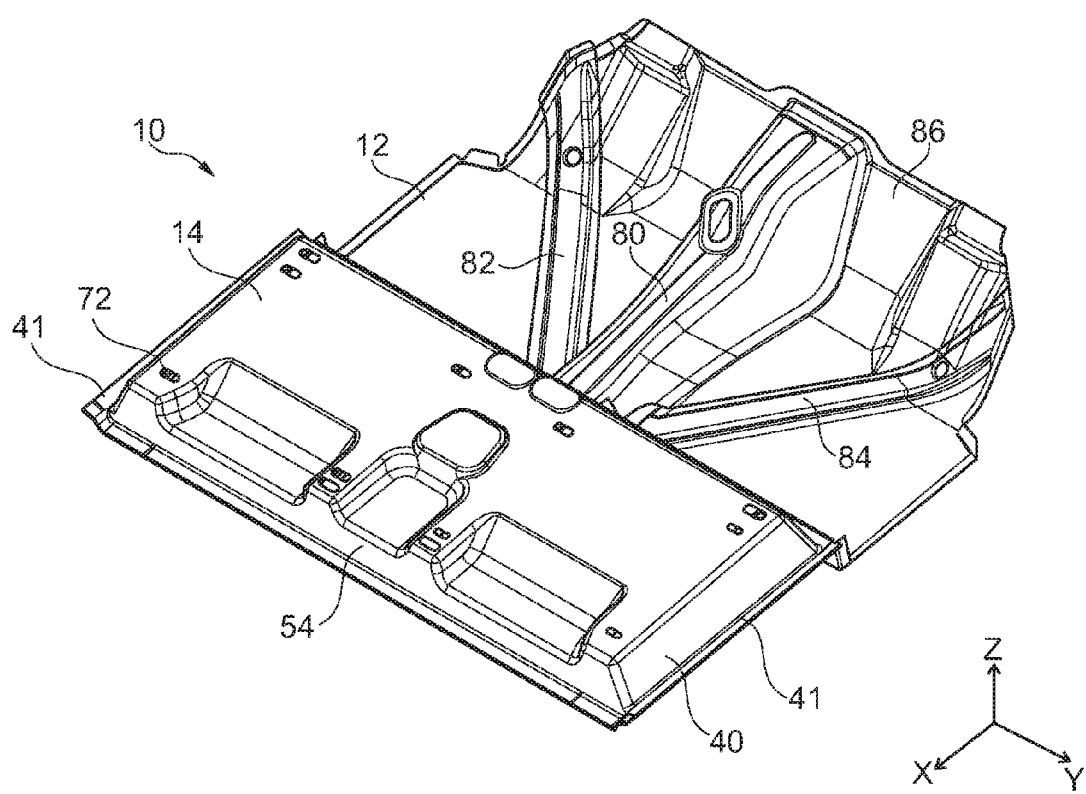
FIG. 5 is a perspective representation of the floor panel.
Figure 6:
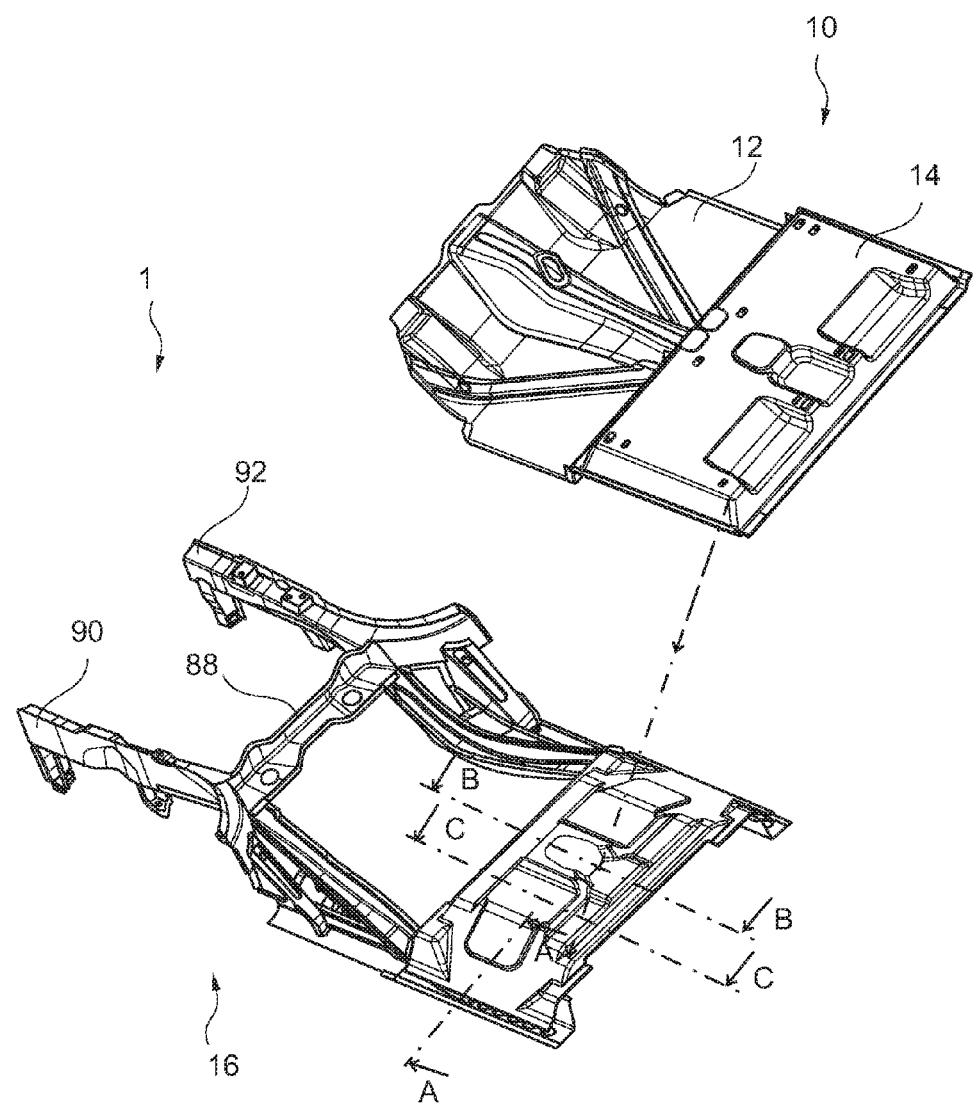
FIG. 6 is a perspective representation of the support structure with a floor panel to be arranged thereon.

The floor panel 10 shown in FIGS. 5 and 6 in different perspective representations in this respect comprises a foot well portion 12 and a seat connection portion 14 that is formed elevated relative to this. The foot well portion 12 and seat connection portion 14 in this case can be configured in one piece. While in the foot well portion 12 a center tunnel portion 80 or a separate center tunnel is provided, the seat connection portion 14 adjoining thereon opposite to the travelling direction 2 can be formed largely free of a center tunnel because of its elevated position. The vehicle components provided below the center tunnel portion 80 can be stowed away below without problems through the position of the seat connection portion 14 which is offset towards the top.

Dependently of this, the foot well portion 12 furthermore comprises two reinforcement profiles 82, 84 which from the center tunnel portion 80, each extend obliquely to the outside and to the front, which have a substantially top-hat profile-like contour and which are closed off by the foot well portion 12 located below subject to forming a hollow profile. The reinforcement profiles 82, 84 adjoin the center tunnel portion 80 approximately facing the transition region towards the seat connection portion 14 located higher.

In FIG. 5, the generally one-piece transition of the foot well portion 12 substantially extending horizontally to a front wall portion 86 rising towards the front and the top is shown. Comparable with the geometrical configuration of the cross member structure 22, the seat connection portion 14 of the floor panel 10 located above also has a shell-like configuration in the form of a predominantly closed areal structure. The seat connection portion 14 shown in the FIGS. 3 to 6 in different perspectives has various troughs 56, 58 at its rear end and at its side edges located in vehicle transverse direction, lateral cheeks 40 sloping downwards the bottom.

An approximately linearly formed flange 41 follows each of the lateral cheeks 40, by means of which the seat connection portion 14, as shown in FIG. 8, can be connected to an upper leg 28 of the inner sill profile 24 which is correspondingly formed thereto. The seat connection portion 14 and the cross member structure 22 located below can thus enclose a profile portion 29 of the inner sill profile 24 projecting to the inside from the top and from the bottom, correspondingly in case or in regions engage about the profile portion 29.

In this regard, a double support on the inner sill profile 24 can be achieved, which is also supports itself from the top as well as from the bottom against the profile portion 29 of the inner sill profile 24 projecting to the inside. The torsional and structural stiffness of the floor structure 1 as well as of the entire motor vehicle body can be advantageously increase through this. Furthermore, by using comparatively large-area individual parts, the number of installed parts can be reduced while simultaneously reducing the assembly effort.

The seat connection portion 14 furthermore comprises a cheek 54 with a flange 64 and its rear end, while located opposite, on an end portion of the seat connection portion 14 located in travelling direction, a stepped, two-piece cheek arrangement is provided. By view FIGS. 4, 9 and 10 together, it is evident that an upper area portion of the seat connection portion 14 substantially formed flat merges, facing forwards in travelling direction 2, into a cheek 52 corresponding to the lateral cheeks 40.

Approximately at the height of the lateral flange 41, however, a shoulder 55 projecting forward extends at the lower end of the cheek 52, which in turn merges into a cheek portion 53 approximately extending substantially perpendicularly downwards. At the lower end of the cheek portion 53, a further lower flange 66 approximately extending substantially horizontally is finally formed, which with a multiple-part configuration of the floor panel 10 can be connected to the front foot well portion 12 or which with a one-piece configuration of the floor panel 10, is formed as integral part of the front foot well portion 12.

Figure 4:
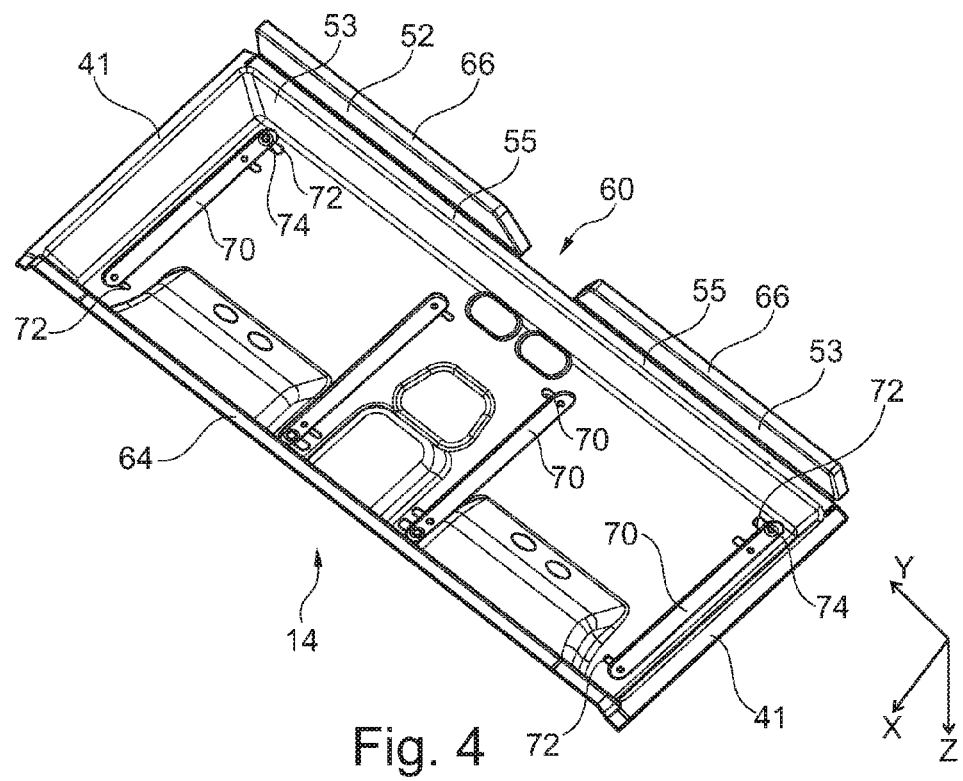
FIG. 4 is the seat connection portion according to FIG. 3 viewed from below.

As is shown in FIG. 4, the lower cheek 53 is penetrated by a mounting 60 for the center tunnel portion 80. The lower cheek 53 can thus be formed in two parts.

Figure 9:
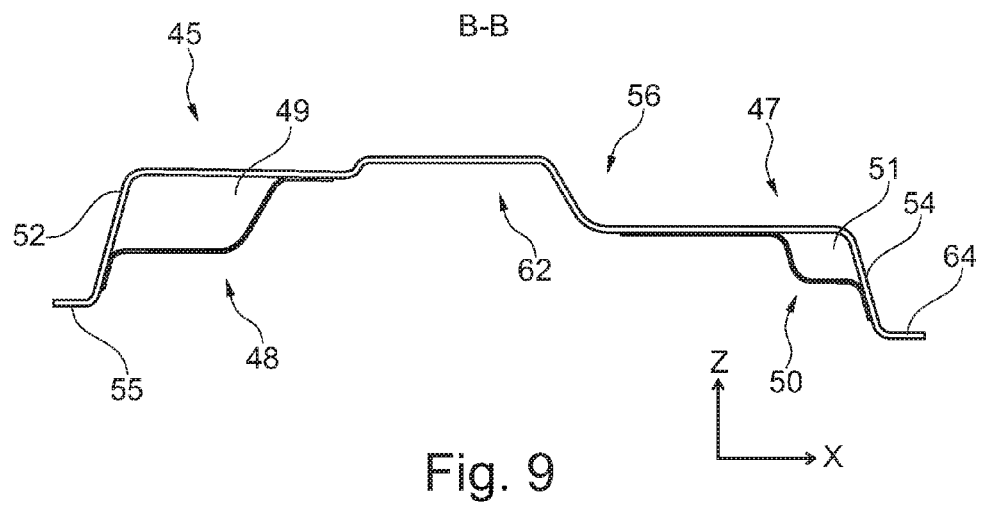
FIG. 9 is a cross-sectional representation along the section line B-B.
Figure 10:
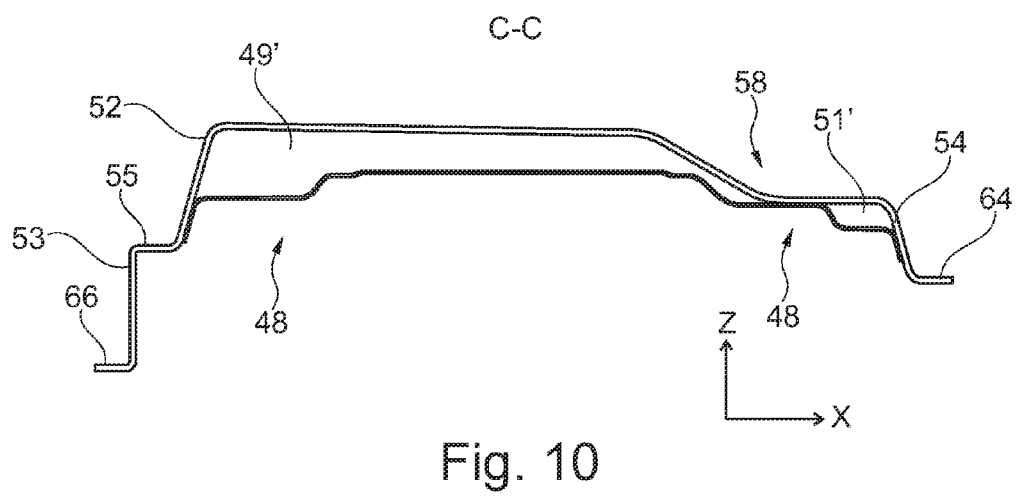
FIG. 10 is a cross-sectional representation laterally offset thereto along the section line C-C according to FIG. 6.

In the cross section of FIGS. 9 and 10, front transverse profile portions 45, 48 of the seat connection portion 14 and the cross member structure 22 which are additionally formed in a mutually corresponding manner are shown, which according to the cross section as per FIG. 9, form an approximately rectangular hollow profile portion 49 between the seat connection portion 14 and the cross member structure 22. In the cross section represented laterally offset thereto in FIG. 10, the corresponding hollow profile portion 49' has an oblong structure, which almost completely extends between the planes formed by the seat connection portion 14 and the cross member structure 22 as far as to the lateral trough 58 at the rear end of the seat connection portion 14.

At the rear end of the seat connection portion 14, too, facing away in travelling direction 2 and the cross member structure 22 correspondingly provided below, transverse profile portions 47, 50 likewise corresponding to one another are provided, which mutually complement one another for configuring a closed hollow profile portion 51 extending in vehicle transverse direction (y). Here, the cross-section profile of the hollow profile portion 51 also changes in vehicle transverse direction (y), as is evident from a comparison of the individual hollow profile portions 51, 51' according to FIGS. 9 and 10.

By viewing FIGS. 1, 2 and 9 together, it is evident, furthermore, that the cross member structure 22 in a middle region has a through-opening 62, which can serve for accommodating individual vehicle components to be provided below the floor panel 10. In the representation according to FIG. 4, altogether four reinforcement rails 70 substantially extending in vehicle longitudinal direction (x) are additionally shown, which extend almost over the entire longitudinal extension (x) of the seat connection portion 14 between front cheek 52 and rear cheek 54.

The reinforcement rails 70 serve for fastening the front seats of the motor vehicle in the region of the seat connection portion 14. These are hereby displaceably held in particular in elongated holes 72, which substantially extend in vehicle transverse direction (y). Because of this, the reinforcement rails 70 provided for the seat fastening can be variably shifted to and fro in vehicle transverse direction (y) in order to be able to receive different-width seats depending on vehicle interior configuration.

On the reinforcement rails 70, individual fastening elements 74, such as for example weld nuts are advantageously provided, which in particular are accessible from the top through the elongated holes 72 of the seat connection portion 14. By means of the reinforcement rails 70 to be provided on the seat connection portion 14 in a preassembled manner, the seat assembly can be improved as well as simplified. In particular, a higher number of equivalent parts can be used for the seat fastening by means of the reinforcement rails 70 which are displaceably mounted in vehicle transverse direction (y).

Furthermore, the cross member structure 22 comprises individual corner supports 44, 46 at its front and rear and on each of the lateral edge portions, which provide a direct support for corner portions of the seat connection portion 14 corresponding therewith. In particular in the corner and transition region, the two floor structure components formed shell-like and corresponding to one another, seat connection portion 14 and cross member structure 22 can be structurally reinforced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A floor structure of a motor vehicle body, comprising:
   a floor panel comprising a front foot well portion and a seat connection portion which with respect to the front foot well portion is formed elevated in vehicle vertical direction; and
   a support structure provided below the floor panel with two longitudinal structures substantially running in vehicle longitudinal direction and in vehicle transverse direction which are spaced from one another,
   wherein each longitudinal structure comprise an inner sill profile projecting to the inside in vehicle transverse direction and a side member profile connected thereto,
   wherein below the seat connection portion a cross member structure formed in one piece and corresponding to the total area of the seat connection portion is connected to the longitudinal structure located opposite in vehicle transverse direction, and
   wherein the cross member structure comprises a lateral connecting slope which closes the side member profile.

2. The floor structure according to claim 1, wherein the cross member structure has a shell-like and predominantly closed areal structure.

3. The floor structure according to claim 1, wherein the cross member structure along its entire extension in vehicle longitudinal direction is structurally connected to the longitudinal structures located opposite.

4. The floor structure according to claim 1, wherein the connecting slope of the cross member structure adjoins a profile portion of the sill profile projecting to the inside from below.

5. The floor structure according to claim 4, wherein the seat connection portion adjoins a profile portion of the inner sill profile projecting to the inside from the top with a lateral cheek.

6. The floor structure according to claim 5, wherein the seat connection portion and the cross member structure located below comprise transverse profile portions corresponding with one another at least at an end alongside the vehicle, which form at least one closed hollow profile portion.

7. The floor structure according to claim 6, wherein on a low side of the seat connection portion at least one reinforcement rail for a seat connection is arranged.

8. The floor structure according to claim 7, wherein the seat connection portion comprises at least one elongated hole extending in vehicle transverse direction for the variable positioning of the reinforcement rail in vehicle transverse direction.

9. The floor structure according to claim 8, wherein the reinforcement rail comprises at least one fastening element for the seat connection.

10. The floor structure according to claim 9, wherein the cross member structure at its front end portion or rear end portion located outside in vehicle transverse direction comprise at least one corner support projecting in vehicle vertical direction for the seat connection portion.

11. The floor structure according to claim 10, wherein the seat connection portion is formed free of a center tunnel.

12. The floor structure according to claim 10, wherein the front foot well portion of the floor panel comprises at least one reinforcement profile extending from a center tunnel portion forward in travelling direction and obliquely to the outside.

13. A motor vehicle, comprising:
- a floor panel comprising a front well portion and a seat connection portion which with respect to the front foot well portion is formed elevated in vehicle vertical direction, the seat connection portion formed free of a center tunnel; and
- a support structure provided below the floor panel with two longitudinal structures substantially running in vehicle longitudinal direction and in vehicle transverse direction which are spaced from one another,
- wherein each longitudinal structure comprises an inner sill profile projecting to the inside in vehicle transverse direction and a side member profile connected thereto.
- wherein below the seat connection portion a cross member structure formed in one piece and corresponding to the total area of the seat connection portion is connected to the longitudinal structure located opposite in vehicle transverse direction, and
- wherein the cross member structure comprises a lateral connecting slope which closes the side member profile.

14. The motor vehicle according to claim 13, wherein the cross member structure has a shell-like and predominantly closed areal structure.

15. The motor vehicle according to claim 13, wherein the cross member structure along its entire extension in vehicle longitudinal direction is structurally connected to the longitudinal structures located opposite.

16. The motor vehicle according to claim 13, wherein the connecting slope of the cross member structure adjoins a profile portion of the sill profile projecting to the inside from below.

* * * * *